United States Patent [19]

Koot

[11] 3,859,860
[45] Jan. 14, 1975

[54] DEVICE FOR RECORDING THE SPEED AND/OR THE COVERED DISTANCE OF A VEHICLE

[75] Inventor: Antonius Cornelis Koot, Utrecht, Netherlands

[73] Assignee: Industrie Koot B.V. Industrieterrein "De Hooge Waard", Montfoort, Netherlands

[22] Filed: June 25, 1973

[21] Appl. No.: 373,298

[30] Foreign Application Priority Data
June 27, 1972 Netherlands .................... 7208869

[52] U.S. Cl. .......................................... 74/12, 74/13
[51] Int. Cl. ................................................ F16h 37/00
[58] Field of Search .................................. 74/12, 13

[56] References Cited
UNITED STATES PATENTS

| | | | |
|---|---|---|---|
| 819,285 | 5/1906 | Jones | 74/12 X |
| 1,191,900 | 7/1916 | Kendall | 74/12 X |
| 1,300,329 | 4/1919 | Berg | 74/12 X |
| 1,459,958 | 6/1923 | Olsen | 74/12 X |
| 1,489,802 | 4/1924 | Turner | 74/12 X |
| 1,634,565 | 7/1927 | Wallbillich | 74/12 |
| 2,665,897 | 1/1954 | Mollenhour | 74/12 X |

*Primary Examiner*—Leonard H. Gerin
*Attorney, Agent, or Firm*—Wenderoth, Lind & Ponack

[57] ABSTRACT

Device for transmitting to a recorder or meter the speed and/or traveled distance of a vehicle, especially of a bicycle, autobike or the like, comprising a casing to be fastened to a part of the vehicle, for instance to a fork-leg, in which casing gearing arrangement is provided, the output shaft of which is connectable with the female thread of a bowden-cable and the input shaft of which is provided with a driving wheel, intended to co-operate with the tire of the vehicle. The input shaft and the output shaft are arranged at an obtuse angle, which output shaft at the end thereof extending into the casing is provided with a bevel gear wheel, which engages into a bevel gear on the boss of a connecting pinion, which connecting pinion is supported in the casing with its axis parallel to that of the input shaft and with a circumferential gear engaging a gear on the end of the output shaft extending into the casing.

3 Claims, 1 Drawing Figure

PATENTED JAN 14 1975　　　　　　　　　　　　　　3,859,860
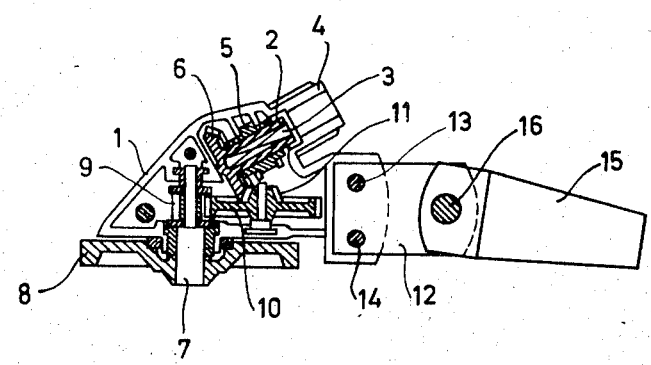

DEVICE FOR RECORDING THE SPEED AND/OR THE COVERED DISTANCE OF A VEHICLE

BACKGROUND OF THE INVENTION

This invention relates to a device for recording the speed and/or the traveled distance of a vehicle, especially of a bicycle, autobike and the like.

Devices of the type described are already known, having adjacent to the axis of the wheel of the vehicle a rim of gear wheel or the like co-operating with a toothed wheel. Such devices have the disadvantage that for each diameter of the wheel a corresponding adapted device will be needed. The dealer in bicycles and autobikes is likewise compelled to keep in stock different devices for recording the speed and/or the traveled distance.

SUMMARY OF THE INVENTION

The present invention provides a more universal device, that is to say that a single embodiment of the device may be mounted on any vehicle.

The device according to the invention principally comprises a casing to be fastened to a part of the vehicle, for instance to a fork-leg, in which casing a gearing arrangement is provided, the output shaft of which may be connected with the female thread of a bowden-cable and the input shaft of which is provided with a driving wheel, intended to co-operate with the tire of the vehicle.

Thus, with the new device the traveled distance is measured, and since the output shaft of the device may be coupled to the female thread of a bowden-cable, the traveled distance may be transmitted immediately to a counting mechanism. In the case that the speed of the vehicle also should be measured, the number of revolutions of the female thread of the bowden-cable may in a conventional way magnetically be transformed into movement of the pointer along a scale. Since according to the invention the wheel of the input shaft co-operates directly with the tire of the vehicle, the traveled distance of the tire is measured directly regardless of the diameter of the wheel. Accordingly, the device according to the invention is universally usable and only one embodiment needs to be manufactured or stocked for all models and sizes of vehicles.

A simple and yet strong construction is obtained if the input and the output shaft are arranged at an obtuse angle. In that case the shafts may be provided more closely together in the casing, by which the whole becomes more compact.

The output shaft of the device has at its end, which extends into the casing, a bevel gear wheel engaging into a bevel gear on the boss of a connecting pinion, which connecting pinion is supported in the casing with its axis parallel to the output shaft, and which engages with a circumferential gear thereof into a gear provided at the end of the input shaft extending into the casing.

BRIEF DESCRIPTION OF THE DRAWING

The invention is discussed further with respect to the single FIGURE of drawings, wherein there is shown a longitudinal section of the device according to the invention.

DETAILED DESCRIPTION OF THE INVENTION

A casing 1 is indicated in the drawing, and for instance can be formed of synthetic material, which casing may be divided along the axial symmetrical plane. If the casing is manufactured from synthetic material both halves can be connected, after the mechanism has been mounted, simply by heat sealing. In the casing 1 a transmission or gearing arrangement is provided, which is constructed of gears. An output shaft 2 is provided with an angled bore 3, intended for coupling with the female thread of a bowden-cable. On the threaded part 4 of the casing the outer casing of the bowden-cable may be fastened by means of a not further depicted swivel. The output shaft 2 is supported by a bearing 5.

The end of the output shaft 2 extending into the casing is provided with a bevel gear wheel 6.

An input shaft 7 is provided with a disc 8, which is intended for co-operation with the tire of the vehicle, especially a bicycle or an autobike. At the end of the shaft 7 within the casing is a gear wheel 9 provided to co-operate with outer gearing of a connecting pinion 10. The shaft of the pinion 10 is parallel with the input shaft 7. A boss 11 of the connecting pinion 10 is provided with bevel gearing, with which the bevel gear 6 engages. As the drawing shows the shafts 2 and 7 extend toward each other at an obtuse angle. Imn the way indicated a very compact gearing arrangement may be attained, and therefore the casing likewise may be of small dimensions. To the casing 10 a resilient lip 12 is connected, for instance by clasping the lip with the sealing together of the parts of the casing 1. For this purpose shafts or pins 13 and 14 are provided in at least one of the parts of the casing. A clip 15 is attached to lip 12 by a screw 16 and nut, the inside dimensions of clip 15 corresponding with the circumference of for instance a fork-leg of the bicycle or of the autobike.

Since the driving wheel 8 at the input shaft may co-operate directly with the tire of the vehicle, the traveled distance may be measured immediately, and regardless of the dimensions of the wheel of the vehicle only one type speed- or distance-meter, respectively, suffices. All component parts may, if desired, be made from synthetic material, whereby the complete device may be manufactured at an extremely low price.

Since the complete mechanism may be enclosed in a relatively small space this results in a small-dimensioned device, is of solid construction.

I claim:

1. A speedometer device for transmitting to a meter or a recorder the speed of and/or the distance traveled by a vehicle, such as a bicycle, an autobike or the like, said device comprising:
   a casing;
   an input shaft extending into said casing and having fixed to the outer end thereof driving wheel means for frictionally contacting a tire of said vehicle;
   an output shaft extending into said casing and having means for connection to the female thread of a bowden-cable;
   means for mounting said casing to said vehicle with said driving wheel means in frictional contact with a tire thereof; and
   transmission gearing means positioned completely within said casing for transmitting rotation of said input shaft to said output shaft and thus to a bowden-cable attachable thereto.

2. A device as claimed in claim 1, wherein said input shaft and said output shaft extend toward each other at an obtuse angle.

3. A device as claimed in claim 2, wherein said transmission gearing means comprises a gear wheel attached to an end of said input shaft positioned within said casing; a connecting pinion mounted within said casing about an axis parallel to said input shaft, said pinion having an outer circumferential gear meshing with said gear wheel, said pinion having a boss with bevel gearing thereon; and a bevel gear attached to an end of said output shaft positioned within said casing, said bevel gear meshing with said bevel gearing of said boss.

* * * * *